United States Patent [19]

Yamaryo

[11] 4,075,763
[45] Feb. 28, 1978

[54] DIAL INDICATOR GAUGE

[75] Inventor: Yasuyuki Yamaryo, Utsunomiya, Japan

[73] Assignee: Kabushiki Kaisha Mitutoyo Seisakusho, Tokyo, Japan

[21] Appl. No.: 694,370

[22] Filed: Jun. 9, 1976

[30] Foreign Application Priority Data

Jan. 8, 1976 Japan .................... 51-000936[U]

[51] Int. Cl.² .............................................. G01B 3/22
[52] U.S. Cl. ................................ 33/172 R; 33/DIG. 6
[58] Field of Search ..................... 33/172 R, DIG. 6

[56] References Cited

U.S. PATENT DOCUMENTS

| 842,044 | 1/1907 | Wells et al. | 33/172 R |
| 2,210,435 | 8/1940 | Ruf | 33/DIG. 6 |
| 2,486,293 | 10/1949 | Kempt | 33/172 R |
| 2,527,173 | 10/1950 | Boat | 33/DIG. 6 |
| 2,663,945 | 12/1953 | Emery | 33/172 R |

Primary Examiner—Richard E. Aegerter
Assistant Examiner—Richard R. Stearns
Attorney, Agent, or Firm—Brisebois & Kruger

[57] ABSTRACT

In a dial indicator gauge in which a stopper pin is provided on a spindle having a contact point so as to restrict the displacement range of the spindle by having the stopper pin come into contact with an inner face of an inner frame of the dial indicator gauge, the dial indicator gauge has a buffer member for softening and absorbing impact force as the stopper pin approaches said the inner frame face.

2 Claims, 2 Drawing Figures

DIAL INDICATOR GAUGE

BACKGROUND OF THE INVENTION

The present invention relates to a dial indicator gauge for reducing impact force caused when a stopper pin provided on a spindle having a contact point comes into contact with an inner face of an inner frame of the dial indicator gauge in which a gear train is housed, thereby preventing a rack formed on the spindle and the gear train meshing with the rack from being damaged.

In conventional dial indicator gauges arranged such that a displacement range of a dial gauge is restricted by a stopper pin attached on a spindle having a contact point and an inner frame face of the dial indicator gauge housing a gear train, the stopper pin attached on the spindle directly comes into contact with the inner frame face of the dial indicator gauge so as to restrict a displacement of the spindle, so that when a rapidly displaced spindle comes into contact with the inner frame face, an impact force generates.

Thus generated impact force operates on and damages gear teeth between a rack formed on the spindle and the gear train meshing with the rack and as a result, it is apt to decline a measuring accuracy of the dial indicator gauge.

The present invention solves the above mentioned drawbacks and is characterized in that between the inner frame face with which a stopper pin comes into contact and the stopper pin, is provided a buffer member which reduces impact force caused when the stopper pin runs against the inner frame face in order to deform the buffer member itself at early stage where the stopper pin comes into contact with the buffer member and, then, to reduce and absorb the impact force caused when the stopper pin comes into contact with the inner frame face by compressing and deforming the buffer member at late stage.

SUMMARY OF THE INVENTION

Accordingly, it is an object of the present invention to provide a dial indicator gauge wherein a buffer member for softening impact force caused when a stopper pin comes into contact with an inner frame face, is interposed between the stopper pin and the inner frame face with which the stopper pin comes into contact.

It is another object of the present invention to provide a dial indicator gauge having said buffer member between the stopper pin and the inner frame face in such an arrangement that the buffer member is kept on the inner frame and is disposed in front of the inner frame face with which the stopper pin comes into contact.

It is another object of the present invention to provide a dial indicator gauge wherein a space is provided between the buffer member and the inner frame face so as to permit a deflective deformation of the buffer member.

Other and further objects of the present invention will become apparent from the following detailed description of the embodiment according to the present invention, with reference to the accompanying drawing.

Figure 1:
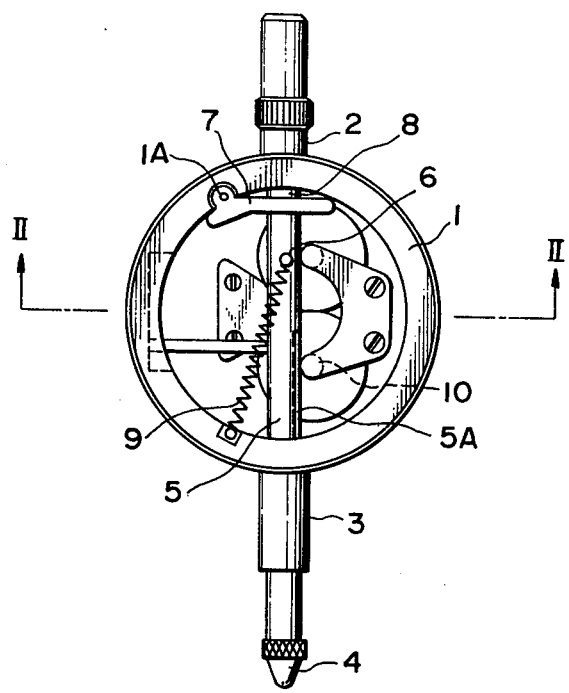
FIG. 1 is a plan view showing one of the embodiments of a dial indicator gauge according to the present invention.
Figure 2:
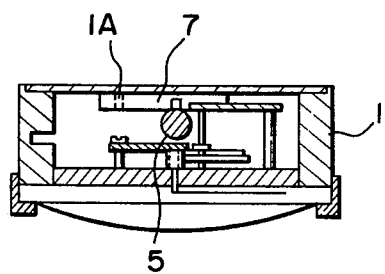
FIG. 2 is a sectional view taken on line II — II of FIG. 1.

As shown in FIGS. 1 and 2, a spindle 5 having a contact point 4 is slidably held on a stem 2 and a bush 3, both, fixed to an inner frame 1 of a dial indicator gauge; a stopper pin 6 is provided so as to stand on the spindle 5; and the spindle 5 is arranged to be displacable toward and away from the bush 3 until the stopper pin 6 comes into contact with the inner face of the inner frame 1.

Moreover, a protrusion 1A is formed on the inner frame at the side of the stem 2, and the one end of a buffer member 7 which has resilient force is engaged with and held on the protrusion 1A. The other end of the buffer member is extendingly provided so as to be disposed in front of the inner face of the inner frame with which the stopper pin 6 comes into contact, and there is a space 8 between the inner face of the inner frame with which the stopper pin 6 comes into contact and the buffer member 7, so as to permit a deflective deformation of the buffer member 7. In this case, a reference numeral 9 indicates a spring for pulling the spindle 5 towards the bush 3, which is fastened between the stopper pin 6 and the inner frame 1 at the side of the stem 2. On the spindle 5 is formed a rack 5A, and a pinion 10 meshes with the rack 5A. Said buffer member 7 consists of a synthetic resin, rubber or the like.

Referring to the dial indicator gauge constructed as the above, the following is an explanation as to an absorbing operation of the impact force generated when the spindle 5 rapidly displaces away from the bush 3 and the stopper pin 6 comes into contact with the inner face of the inner frame 1. First, the stopper pin 6 provided on the spindle 5 comes into contact with the buffer member 7. In this case, as the space 8 is provided between the buffer member 7 and the inner frame 1, the buffer member 7 deflects until it touches the inner face of the inner frame 1, thereby reducing and absorbing kinetic energy of the stopper pin 6. Furthermore, the kinetic energy of the stopper pin 6 can be softened and absorbed by compressingly deforming the buffer member 7 and as a result, the spindle 5 can stop without receiving impact force. When the spindle 6 is released from the buffer member 7, the buffer member 7 restores, thereby reforming the space 8 between the buffer member 7 and the inner face of the inner frame 1.

According to the present invention mentioned as the above, since the impact force caused when the stopper pin comes into contact with the inner frame face is arranged to be reduced and absorbed due to the deflective deformation and compressive deformation of the buffer member, it can effectively reduce and absorb impact force generated when the stopper pin comes into contact with the buffer member, and furthermore, can prevent the rack provided with the spindle and the gear teeth of the trains of gearings meshing with the rack from being damaged. Thanks to these effects, the measuring accuracy of the dial indicator gauge can be maintained for a long period of time and the measuring life can be extended.

What is claimed is:

1. In a dial indicator gauge comprising a ring-shaped frame member, a spindle mounted for translational movement diametrically of said frame member, and a stopper pin projecting transversely from said spindle and positioned to strike the inner surface of said frame member when said spindle moves more than a predetermined distance relative thereto, the improvement which comprises an elongated buffer member extending across the path of travel of said stopper pin between said stopper pin and said inner surface so as to be struck by said stopper pin before it reaches said inner surface and delimiting an open space between said buffer member and inner surface, said buffer member being both resilient and compressible so that when struck by said stopper pin said buffer member first deforms into said space and is then compressed when further movement of said stopper pin squeezes said buffer member against said inner surface.

2. Dial indicator gauge as claimed in claim 1 in which said frame member carries diametrically opposed bushings in which said spindle is slidably mounted.

* * * * *